United States Patent [19]

Otobe et al.

[11] Patent Number: 4,696,273

[45] Date of Patent: Sep. 29, 1987

[54] IGNITION TIMING CONTROL METHOD FOR INTERNAL COMBUSTION ENGINES

[75] Inventors: Yutaka Otobe, Shiki; Yoshio Suzuki, Wakoh; Shigehiro Kimura, Niiza; Naoki Ohsawa, Wakoh, all of Japan

[73] Assignee: Honda Giken Kogyo K.K., Tokyo, Japan

[21] Appl. No.: 866,462

[22] Filed: May 22, 1986

[30] Foreign Application Priority Data

May 27, 1985 [JP] Japan .............................. 60-113762
May 31, 1985 [JP] Japan .............................. 60-117967

[51] Int. Cl.$^4$ .............................................. F02P 5/04
[52] U.S. Cl. .................................... 123/417; 123/480
[58] Field of Search ............... 123/425, 435, 416, 417, 123/426, 488, 480

[56] References Cited

U.S. PATENT DOCUMENTS 4,250,858  2/1981  Jeenicke .............................. 123/416
4,258,683  3/1981  Hattori ................................ 123/416
4,478,185 10/1984  Obayashi ............................ 123/417

Primary Examiner—Ronald B. Cox
Attorney, Agent, or Firm—Arthur L. Lessler

[57] ABSTRACT

An ignition timing control method for an internal combustion engine wherein a plurality of correction values for ignition timing are stored in memory means beforehand as a function of an output voltage from a variable voltage creating means which is humanly adjustable and the rotational speed of the engine. The output voltage from the variable voltage creating means and the rotational speed of the engine are detected, and one of the correction values is read, which corresponds to the detected output voltage and the detected rotational speed of the engine. Then, the ignition timing is corrected by the use of the read one correction value. Further, a value of a parameter indicative of load on the engine is detected, and the ignition timing control is executed when the detected value of the parameter is above a predetermined value. Alternatively, in place of the correction values, address values are stored in memory means. One of the address values is read, which corresponds to the detected output voltage and converted to a numerical value in the number system with a predetermined number as the base. The figures of the numerical value correspond to respective regions of the engine rotational speed. A correction value for correcting the ignition timing is determined in accordance with one of the figures of the numerical value corresponding to the region of the engine rotational speed in which the engine is detected to be operating.

10 Claims, 5 Drawing Figures

FIG.3

| VPRO POINT | VPRO IG (VOLT) | θIGVPRO3 (VPROD3) | θIGVPRO2 (VPROD2) NIGPR1 | θIGVPRO1 (VPROD1) NIGPR2 |
|---|---|---|---|---|
| 1 | 0.16 | 0 | 0 | 0 |
| 2 | 0.33 | 0 | 0 | 2(1) |
| 3 | 0.51 | 0 | 0 | 4(2) |
| 4 | 0.68 | 0 | 2(1) | 0 |
| 5 | 0.92 | 0 | 2(1) | 2(1) |
| 6 | 1.15 | 0 | 2(1) | 4(2) |
| 7 | 1.33 | 0 | 4(2) | 0 |
| 8 | 1.50 | 0 | 4(2) | 2(1) |
| 9 | 1.68 | 0 | 4(2) | 4(2) |
| 10 | 1.86 | 2(1) | 0 | 0 |
| 11 | 2.03 | 2(1) | 0 | 2(1) |
| 12 | 2.21 | 2(1) | 0 | 4(2) |
| 13 | 2.38 | 2(1) | 2(1) | 0 |
| 14 | 2.56 | 2(1) | 2(1) | 2(1) |
| 15 | 2.79 | 2(1) | 2(1) | 4(2) |
| 16 | 3.03 | 2(1) | 4(2) | 0 |
| 17 | 3.20 | 2(1) | 4(2) | 2(1) |
| 18 | 3.38 | 2(1) | 4(2) | 4(2) |
| 19 | 3.55 | 4(2) | 0 | 0 |
| 20 | 3.73 | 4(2) | 0 | 2(1) |
| 21 | 3.91 | 4(2) | 0 | 4(2) |
| 22 | 4.08 | 4(2) | 2(1) | 0 |
| 23 | 4.26 | 4(2) | 2(1) | 2(1) |
| 24 | 4.43 | 4(2) | 2(1) | 4(2) |
| 25 | 4.61 | 4(2) | 4(2) | 0 |
| 26 | 4.79 | 4(2) | 4(2) | 2(1) |
| 27 | 5.00 | 4(2) | 4(2) | 4(2) |

FIG. 4

| VPRO POINT | VPRO 1G | θ1GVPRO3 | θ1GVPRO2 | θ1GVPRO1 |
|---|---|---|---|---|
| 1 | 0.16 | 00000000 | 00000000 | 00000000 |
| 2 | 0.33 | 00000000 | 00000000 | 00000000 |
| 3 | 0.51 | 00000000 | 00000000 | 00000000 |
| 4 | 0.68 | 00000000 | 00000000 | 00000000 |
| 5 | 0.92 | 00000000 | 00000000 | 00000000 |
| 6 | 1.15 | 00000000 | 00000000 | 00000000 |
| 7 | 1.33 | 00000000 | 00000010 | 00000010 |
| 8 | 1.50 | 00000010 | 00000010 | 00000010 |
| 9 | 1.68 | 00000010 | 00000010 | 00000010 |
| 10 | 1.86 | 00000010 | 00000010 | 00000010 |
| 11 | 2.03 | 00000010 | 00000010 | 00000010 |
| 12 | 2.21 | 00000010 | 00000010 | 00000010 |
| 13 | 2.38 | 00000010 | 00000010 | 00000010 |
| 14 | 2.56 | 00000010 | 00000010 | 00000010 |
| 15 | 2.79 | 00000010 | 00000010 | 00000100 |
| 16 | 3.03 | 00000010 | 00000100 | 00000100 |
| 17 | 3.20 | 00000100 | 00000100 | 00000100 |
| 18 | 3.38 | 00000100 | 00000100 | 00000100 |
| 19 | 3.55 | 00000100 | 00000100 | 00000100 |
| 20 | 3.73 | 00000100 | 00000100 | 00000100 |
| 21 | 3.91 | 00000100 | 00000100 | 00000100 |
| 22 | 4.08 | 00000100 | 00000100 | 00000100 |
| 23 | 4.26 | 00000100 | 00000100 | 00000100 |
| 24 | 4.43 | 00000100 | 00000100 | 00000100 |
| 25 | 4.61 | 00000100 | 00000100 | 00000100 |
| 26 | 4.79 | 00000100 | 00000100 | 00000100 |
| 27 | 5.00 | 00000100 | 00000100 | 00000100 |

# IGNITION TIMING CONTROL METHOD FOR INTERNAL COMBUSTION ENGINES

BACKGROUND OF THE INVENTION

This invention relates to an ignition timing control method for internal combustion engines and, more particularly, to a method of this kind which is capable of adjusting the ignition timing to an optimal value in a simple manner at the time of delivery of the engines from the plant as well as at the time of maintenance operation.

There is known an ignition timing control method for internal combustion engines which includes reading from memory means (e.g. ROM) basic advance angle control data corresponding to basic operating parameters of the engine, e.g. engine rotational speed and intake passage absolute pressure as load on the engine as well as correction advance angle control data corresponding to engine coolant temperature, intake air temperature, etc., calculating ignition timing optimal to engine operating conditions on the basis of the read basic advance angle control data and correction advance angle control data, and controlling conduction of the ignition coil and interruption of same by the ignition timing thus calculated.

However, there can occur variations in operating characteristics or performance between engines in different production lots. As a consequence, if the ignition timing obtained based upon advance angle control data which is determined in the trial manufacture is applied to engines which have different operating characteristics, knocking can occur in a particular operating region. Although knocking which occurs in low load conditions of the engine does not form a grave problem, knocking which occurs in high load conditions of the engine badly affects the operation of the engine.

One way to solve this problem would be to rewrite the whole contents in fixed memory means in which advance angle control data are stored, or replace the fixed memory means with different ones. However, it requires a great deal of labor and time, and accordingly invites a high cost.

On the other hand, the manner of controlling engine operation has become more and more complicated with recent progress of control technology for internal combustion engines, and the quantity of control data is increasing accordingly. Therefore, it is necessary to employ memory means with an increased capacity so as to cope with the increasing quantity of control data to be stored, without incurring an increase in the cost.

However, the whole quantity of data to be stored in memory means, that is, basic control data and correction control data, will be immense. Therefore, if a control unit is so constructed that correction control data are stored in memory means different from those for storing basic control data, it will invite a greater increase in the product cost. It is therefore desirable to reduce the quantity of basic control data and correction control data to be stored in memory means.

SUMMARY OF THE INVENTION

It is an object of the invention to provide an ignition timing control method for internal combustion engines which is capable of correcting the ignition timing determined based upon advance angle control data in a simple manner without changing the memory means for storing the advance angle control data.

It is another object of the invention to provide an ignition timing control method for internal combustion engines which is capable of reducing the quantity of correction control data to be stored in the memory means.

According to a first aspect of the invention, there is provided an ignition timing control method for an internal combustion engine wherein ignition timing of the engine is controlled in response to operating conditions of the engine to appropriate values for the operating conditions of the engine, based upon advance angle control data read from memory means in which they are stored. The method is characterized by comprising the following steps: (1) storing beforehand a plurality of correction values as a function of an output voltage from a variable voltage creating means which is humanly adjustable and the rotational speed of the engine; (2) detecting the output voltage from the variable voltage creating means; (3) detecting the rotational speed of the engine; (4) reading one of the correction values, which corresponds to the detected output voltage and the detected rotational speed of the engine; and (5) correcting the ignition timing by the use of the read one correction value.

Preferably, the method includes the step of detecting a value of a parameter indicative of load on the engine, and wherein the steps (3)–(5) are executed when the detected value of the parameter is above a predetermined value.

Also preferably, the step (5) comprises retarding the ignition timing by the read one correction value.

Further preferably, the variable voltage creating means is adjusted to cause selection of the correction values for the ignition timing so as to prevent knocking of the engine in a predetermined high load condition.

According to a second aspect of the invention, there is provided an ignition timing control method for an internal combustion engine wherein ignition timing of the engine is controlled in response to operating conditions of the engine to appropriate values for the operating conditions of the engine, based upon advance angle control data read from memory means in which they are stored. The method is characterized by comprising the following steps: (1) storing beforehand a plurality of stored values corresponding to respective different values of an output voltage from a variable voltage creating means which is humanly adjustable; (2) providing a predetermined number of divided regions of the rotational speed of the engine; (3) detecting the output voltage from the variable voltage creating means; (4) reading one of the stored values, which corresponds to the detected output voltage; (5) converting the read one stored value into a numerical value in the number system with a predetermined number as the base, the numerical value being of the same number of figures as the predetermined number of the divided regions of the engine rotational speed, the figures corresponding to respective ones of the regions of the engine rotational speed; (6) detecting the rotational speed of the engine: (7) detecting in which of the regions of the engine rotational speed the detected engine rotational speed lies; and (8) determining a correction value for correcting the ignition timing in accordance with one of the figures of the numerical value corresponding to the detected divided region of the engine rotational speed.

Preferably, the smallest one of the plurality of stored values corresponds to the smallest one of the different values of the output voltage from the variable voltage creating means and is converted to a numerical value equal to zero in the number system with the predetermined number as the base.

Preferably, the method includes the step of detecting a value of a parameter indicative of load on the engine, and wherein the steps (3)–(8) are executed when the detected value of the parameter is above a predetermined value.

Also preferably, the step (8) comprises retarding the ignition timing by the read one correction value.

Further preferably, the variable voltage creating means is adjusted to cause selection of the correction values for the ignition timing so as to prevent knocking of the engine in a predetermined high load condition.

The above and other objects, features and advantages of the invention will be more apparent from the ensuing detailed description taken in conjunction with the accompanying drawings.

BRIEF DESCRIPTION OF THE DRAWINGS

FIG. 3 is a view showing a table of the relationship between the voltage values VPRO IG settable by a variable voltage creating means, address values (VPRO POINT), and correction values $\theta$IGVPROi (VPRODi) applied in respective predetermined engine rotational speed regions;

FIG. 4 is a view showing the contents of a ROM 27 storing the table shown in FIG. 3, by a conventional method.

DETAILED DESCRIPTION

The method according to the invention will now be described in detail with reference to the drawings.

Figure 1:
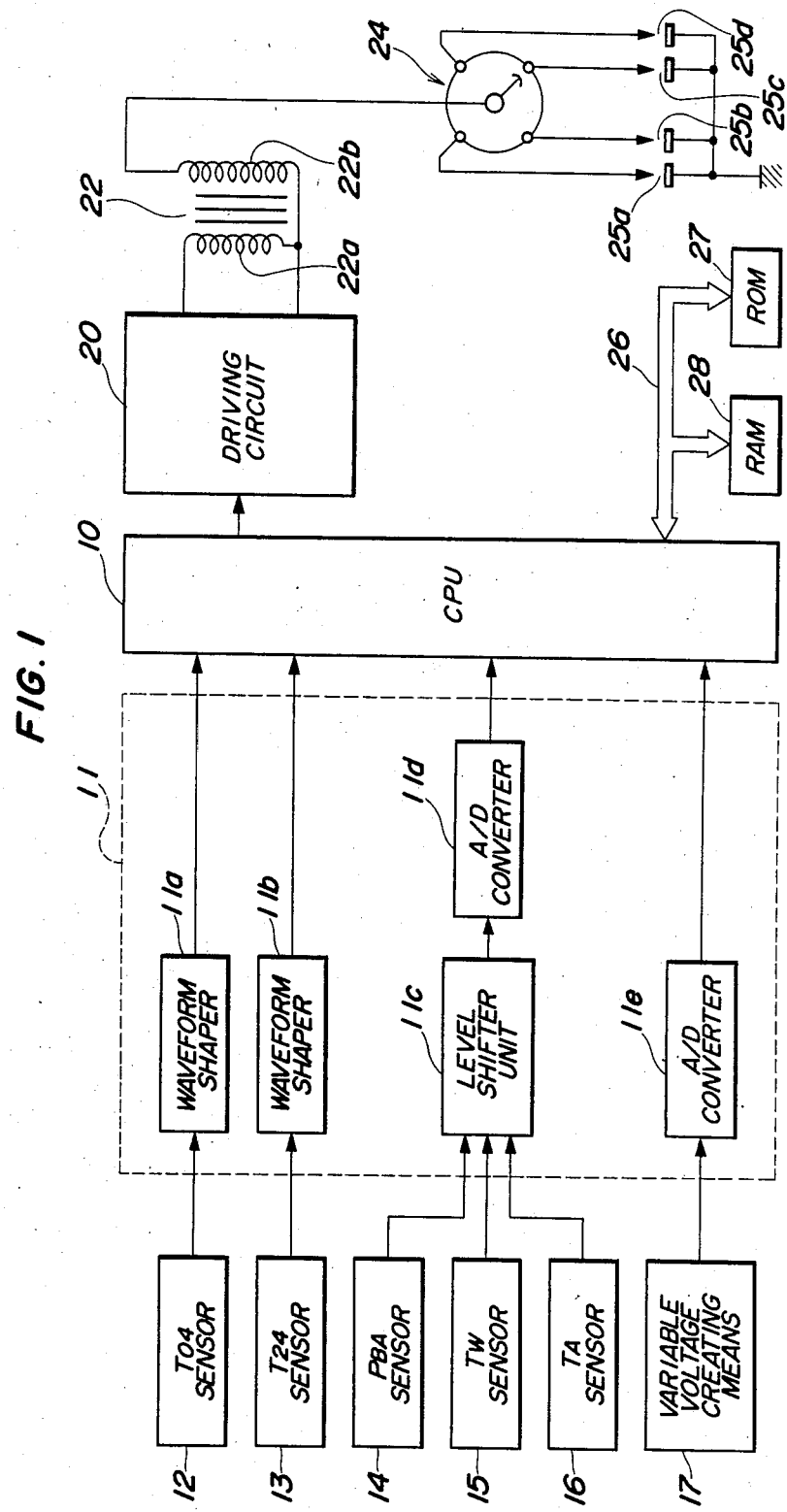
FIG. 1 is a block diagram of the whole arrangement of an ignition timing control system for internal combustion engines, to which is applied the method according to the present invention.

FIG. 1 illustrates the whole arrangement of an ignition timing control system for internal combustion engines, for practicing the method according to the present invention. The ignition timing control system in FIG. 1 controls the ignition timing of the engine which may be a four cylinder type, for example. Reference numeral 10 designates a central processing unit (hereinafter called "the CPU"), to an input side of which are connected various sensors by way of an input circuit 11. To be specific, a T04 sensor 12 and a T24 sensor 13 are connected to the CPU 10 through respective waveform shapers 11a 11b in the input circuit 11. Further connected via the input circuit 11 to the CPU 10 are a PBA sensor 14 for detecting absolute pressure (PBA) within an intake pipe of the engine at a location downstream of a throttle valve therein, an engine coolant temperature (TW) sensor 15 for detecting engine coolant temperature, and a TA sensor 16 for detecting intake air temperature (TA), these sensors generating respective analog signals which are supplied to the CPU 10 after being shifted in voltage level to a predetermined level by a level shifter unit 11c and being converted into digital signals by an A/D converter 11d.

The T04 sensor 12 is arranged e.g. in facing relation to a camshaft, not shown, of the engine, to generate a pulse of a T04 signal indicative of a reference crank angle position of each engine cylinder, at a particular angle position immediately before top-dead-center (TDC) point of the cylinder upon completion of the compression stroke. The signal T04 is supplied to the CPU 10 after having its pulse waveform shaped by the waveform shaper 11a [(a) of FIG. 2]. The T24 sensor 13 is arranged in facing relation to the camshaft, in the same manner as the T04 sensor 12, to generate a pulse of a T24 signal each time a crankshaft of the engine rotates through a predetermined angle (e.g. 30 degrees). The T24 signal is supplied to the CPU 10 after having its pulse waveform shaped by the waveform shaper 11b [(b) of FIG. 2].

Further, a variable voltage creating means 17 is connected to the input side of the CPU 10 via an A/D converter 11e. The variable voltage creating means 17 is composed e.g. of a variable resistor and generates various voltage values VPRO IG as shown in FIG. 3. The voltage value VPRO IG is converted into a digital value by the A/D converter 11e and then inputted to the CPU 10. The variable voltage creating means 17 can be adjusted by the operator at the time of delivery in a mass production process or at the time of maintenance operation to generate a desired voltage value VPRO IG conforming to the engine applied, that serves to correct the ignition timing by a desired retard amount so that knocking does not occur in a predetermined high load region (PBA > PBIGPR in Fig. 5).

On the other hand, a driving circuit 20 is connected to the CPU 10 at its output side, for supplying coil excitation power to a primary coil 22a of an ignition coil 22 for energizing same. A secondary coil 22b of the ignition coil 22 is connected to ignition plugs 25a–25d of respective engine cylinders via a distributor 24.

Further connected to the CPU 10 via a bus 26 are a ROM 27 which stores a control program executed within the CPU 10, etc. and a RAM 28 which temporarily stores calculated values, etc. from the CPU 10.

Next, the operation of the ignition timing control system constructed as above will be described with reference to FIGS. 2-5. The term "stage" as used in FIG. 2 refers to the time interval between the leading edges of two adjacent pulses of the T24 signal, that is, an interval equivalent to the crank angle of 30 degrees. These stages are numbered consecutively from 0 to 5 starting from the first stage. Processing for execution of the ignition timing control program proceeds stage by stage.

Figure 2:
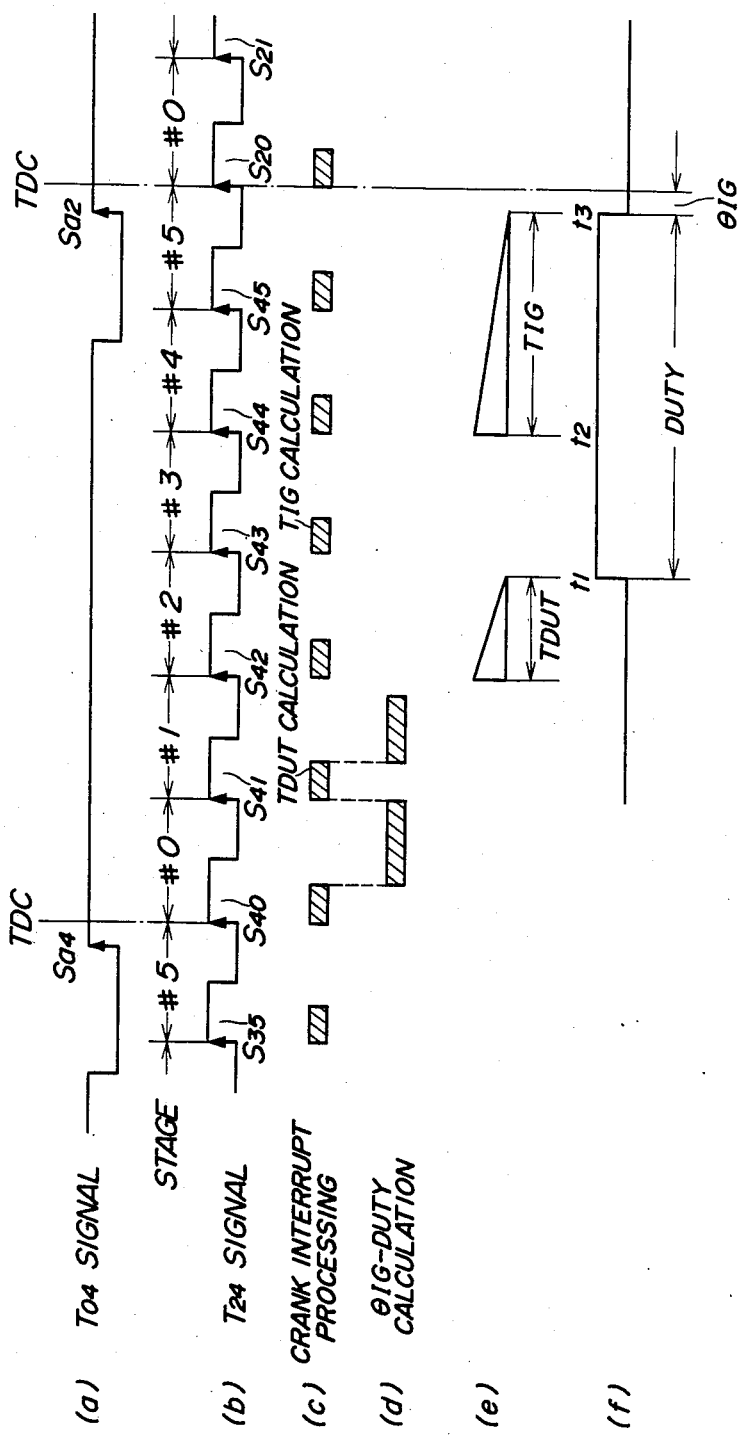
FIG. 2 is a timing chart illustrating a manner of generation of pulses of a T24 signal and timing of calculation of the ignition advance angle $\theta$IG and ignition timing.

To be specific, the ignition timing control program comprises a crank interrupt processing program [(c) of FIG. 2] executed each time a pulse of the T24 signal is generated, and a $\theta$IG - DUTY calculation program [(d) of FIG. 2] executed following the end of the crank interrupt processing program. If a pulse of the T24 signal is inputted to the CPU 10 during execution of the $\theta$IG - DUTY calculation program, the crank interrupt processing program is executed with priority to the $\theta$IG - DUTY calculation program.

The CPU 10 performs calculations to determine various data such as the ignition advance angle $\theta$IG, the conduction control value DUTY, and the ignition timing TIG. First, the ignition advance angle $\theta$IG is calculated in accordance with the engine rotational speed Ne, the intake pipe absolute pressure PBA, the engine coolant temperature TW, etc. by the use of the following equations (1) and (2):

$$\theta IG = \theta MAP + \theta IGCR \quad (1)$$

$$\theta IG' = \theta IG - \theta IGVPRO \quad (2)$$

where the ignition advance angle $\theta IG$ is expressed in terms of the crank angle before a crank angle position, e.g. TDC position, at which a T24 signal pulse, e.g. S20 in (b) of FIG. 2 is generated immediately after a T04 signal, e.g. Sa2 [(a) of Fig. 2] indicative of the reference crank angle position of a cylinder, e.g. the second cylinder, within which ignition should be effected. $\theta MAP$ represents a basic ignition timing or ignition advance angle which is determined as a function of engine rotational speed Ne and intake pipe absolute pressure PBA and read from a map stored in the ROM 27. $\theta IGCR$ represents a correction variable for correcting the basic advance angle value $\theta MAP$, which is read from a table stored in the ROM 27 in accordance with the engine coolant temperature TW, intake air temperature TA and atmospheric pressure PA. The engine rotational speed Ne is calculated by counting the number of clock pulses of a constant period produced during the time interval between adjacent pulses of the T24 signal.

The equation (2) is applied only when the engine is in a predetermined high load condition. In the equation (2), $\theta IGVPRO$ represents a correction variable, which is applied as a retard correction value, only when the engine is in the predetermined high load condition, and constitutes a feature of the present invention. $\theta IGVPRO$ will be described in greater detail later.

The conduction control value DUTY is a function of the engine rotational speed Ne and read from a table stored in the ROM 27 in a manner similar to that described above. The read value is corrected by a value corresponding to the battery voltage before being applied to the conduction control.

Further, the conduction timing DUTY and the ignition timing TIG are calculated based upon the ignition advance angle value $\theta IG$ and the conduction control value DUTY and loaded respectively into a conduction down-counter and an ignition down-counter, neither of which is shown in FIG. 1.

Next, the retard correction value $\theta IGVPRO$ according to the invention will now be explained with reference to FIGS. 3-5.

FIG. 3 shows examplary values of the retard correction value $\theta IGVPRO$. The variable voltage creating means 17 is adjusted by the operator to generate a desired value between 0–5.00 V, which prevents knocking in the engine during operation in the predetermined high load condition. The voltage range of 0–5.00 V is subdivided e.g. into twenty seven voltage ranges VPRO POINTs Nos. 1–27. For example, VPRO POINT1 has a range of 0–0.16 V, and VPRO POINT2 0.16–0.33 V. The engine rotational speed region within which $\theta IG$ VPRO is applied is also subdivided e.g. into three regions defined by predetermined values NIGPR1 and NIGPR2, referred to in FIG. 5 later. For each VPRO POINT there are provided three retard correction values $\theta IGVPR01$, $\theta IGVPR02$, $\theta IGVPR03$. To be specific, the retard correction value $\theta IGVPR01$ is applied when the engine rotational speed is above the predetermined value NIGPR2 (e.g. 5000 rpm), the retard correction value $\theta IGVPR02$ when the engine rotational speed lies between the two predetermined values NIGPR2 and NIGPR1 (e.g. 3000 rpm), and the other retard correction value $\theta IGVPR03$ when the engine rotational speed is below the predetermined value NIGPR1, respectively.

In the table of FIG. 3, if values 2 and 4 are replaced respectively with values 2 and 1, as parenthesized beside each retard correction value $\theta IGVPROi$ (i=1, 2, 3), it will be noted that the resulting sequence made of a combination of the retard correction values $\theta IGVPR01$, $\theta IGVPR02$, and $\theta IGVPR03$ corresponding to each VPRO POINT represents a value of 3 figures in the ternary system (e.g. when VPRO POINT =12, the values $\theta IGVPROi$ are 1, 0, and 2, respectively). The present invention is based upon this idea.

To be specific, values VPRODi (i=1, 2, 3) representing respective digit places of the ternary value, that is, VPROD1, VPROD2, and VPROD3 are all set at 0. The VPRO POINT numbers representing the subdivided voltage ranges are stored in the ROM 27. A VPRO POINT number corresponding to an actual output voltage from the variable voltage creating means 17, i.e. a VPRO IG value is read from the ROM and converted to a ternary VPRODi value to thereby obtain a desired retard correction value $\theta IGVPROi$ (i=1, 2, 3). By the virtue of this manner, data that should be stored in the ROM 27 is only VPRO POINT numbers, while $\theta IGVPROi$ values, which would be conventionally stored in the ROM 27, are determined by calculation in accordance with a control program, described later. Therefore, the quantity of data to be stored in the ROM 27 can be greatly reduced.

How many bytes of data can actually be reduced will now be explained with reference to FIG. 4 which shows a conventional manner of storing the table of FIG. 3 in the ROM 27. In the figure, each VPRO POINT number serves as an address in the ROM. Each address is provided with three storage areas $\theta IGVPR03$, $\theta IGVPR02$, and $\theta IGVPR01$, which are each formed of 1 byte. Therefore, the total storage capacity that is required to store the retard correction values in the ROM 27 is 3 (bytes)×27 (VPRO POINTs)=81 (bytes). On the other hand, according to the present invention, although about 25 bytes of storage area are required to store a program for converting the VPRO POINT numbers to values in the ternary system, the above-mentioned 81 bytes of storage area are not needed, so that the total storage capacity is reduced by about 56 bytes. Further, if the total number of VPRO POINTs is doubled, that is, increased to 54, the required total storage capacity is only about 30 bytes for storing the control program, obtaining a greater reduction ratio of the storage capacity.

Figure 5:
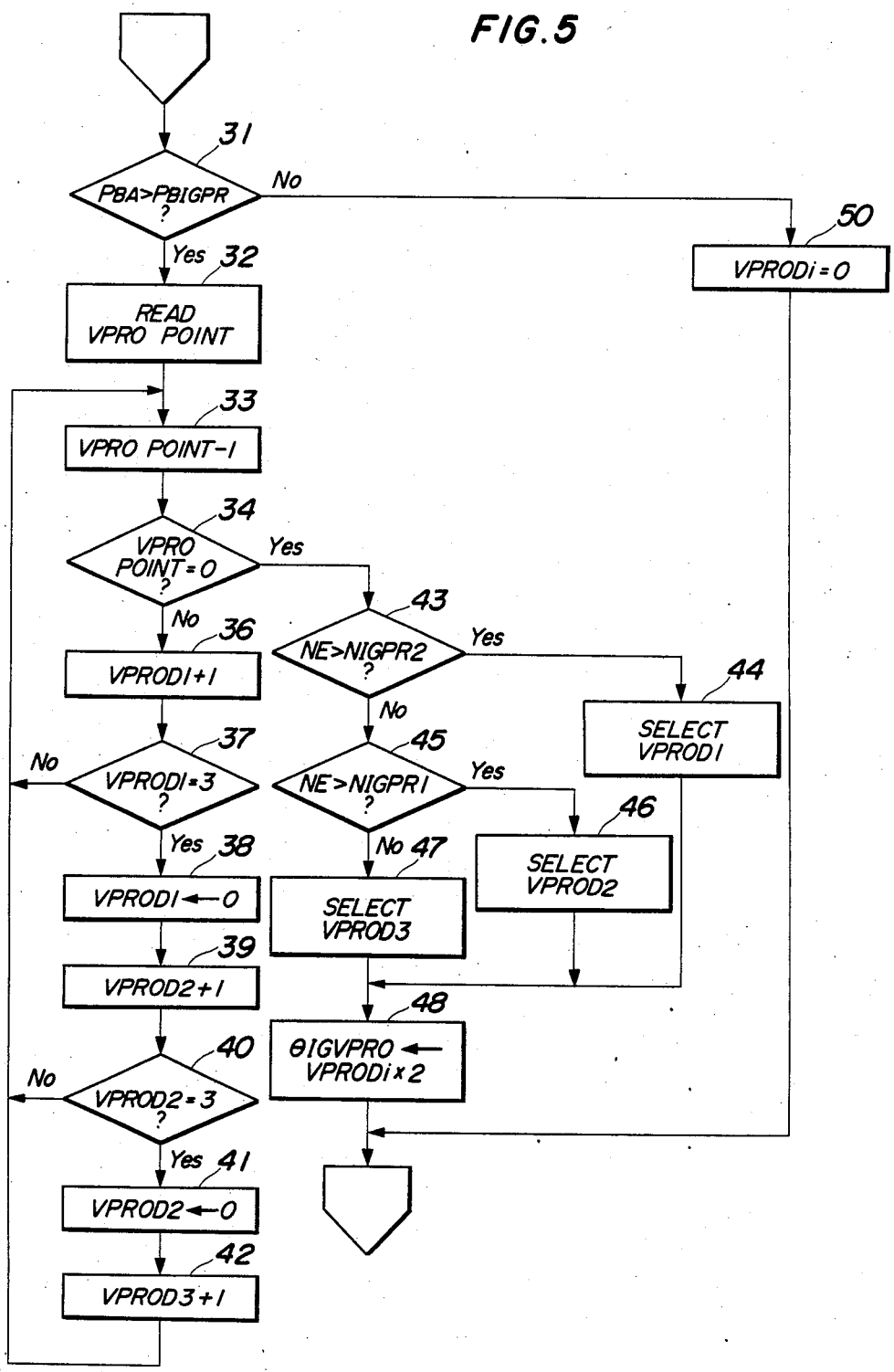
FIG. 5 is a flow chart showing a manner of calculating the correction value $\theta$IGVPRO and correcting the ignition advance angle $\theta$IG by the correction value thus calculated, according to the invention.

Reference is now made to a manner of obtaining the retard correction value $\theta IGVPRO$ by converting a VPRO POINT number to a value in the ternary system with reference to FIG. 5.

First, it is determined at the step 31 whether or not the absolute pressure PBA detected by the PBA sensor 14 is above a predetermined value PBIGPR (e.g. 400 mmHg), that is, whether or not the engine is operating in the predetermined high load condition. If the answer to the question at the step 31 is negative or no, the program is terminated after each correction value VPRODi (i=1, 2, 3) is set to 0 at the step 50. On the other hand, if the answer at the step 31 is affirmative or yes, the program proceeds to the step 32 wherein a set output voltage from the variable voltage creating means 17 is read, and a VPRO POINT number corresponding to the read set voltage VPRO IG is read from the ROM 27. Then, steps 33–42 are repeated to decrease the read VPRO POINT number by 1 in each loop until it is determined at the step 34 that the VPRO POINT number is 0. Let it now be assumed, for example, that VPRO POINT 10 is read from the ROM 27 at the step 32, 10, corresponding to VPRO POINT 10, is decreased by 1 at the step 33. As the resulting decreased value is not 0, the answer to the question of the step 34 is negative or no. Then, 1 is added to the retard correction value VPROD1 (initially set at 0) at the step 36. Next, it is determined at the step 37 whether or not the resulting VPROD1 value is 3. As the present VPROD1 value is 1, the answer to the question of the step 37 is negative or no, and then the program returns to the step 33. If the answer at the step 37 is affirmative or yes after the above-mentioned operations are repeated (the VPRO POINT value has then been decreased to 7), the program proceeds to the next steps 38–40, wherein the retard correction value VPROD1 is set to 0 (step 38), 1 is added to the retard correction value VPROD2 (initially set at 0), that is, a carry is effected (step 39), and it is determined whether or not the resulting value is 3 (step 40). As the value VPROD2 is 1 in the present loop, the determination result at the step 40 is negative or no. Then, the program returns to the step 33 to repeat the operations of the steps 33–40. When the VPRO POINT value becomes 1 in the ninth loop, the determination result at the step 37 becomes affirmative or yes. Then, the program proceeds to next steps 38, 39, wherein the retard correction value VPROD1 is reset to 0 (step 38) and a carry is effected on the retard correction value VPROD2 (step 39). Consequently, the value VPROD2 is 3 so that the determination result at the step 40 is affirmative or yes. Then, the program returns to the step 33 after resetting the retard correction value VPROD2 to 0 (step 41) and adding 1 to the retard correction value VPROD3, that is, effecting a carry on VPROD3 (step 42). When the VPRO POINT value is decreased by 1 at the step 33, the resulting value is 0. Accordingly, the determination result at the step 34 is affirmative or yes, and then the above-described process of converting the VPRO POINT value to the ternary system is terminated. Now, the program proceeds to the step 43.

In the process described above, the retard correction values VPRODi corresponding to VRPO POINT 10 have been determined such that VPROD1=0, VPROD2=0, and VPROD3=1.

Next, the program proceeds to the step 43 wherein it is determined whether or not the engine rotational speed Ne is above the aforementioned predetermined value NIGPR2 (e.g. 5000 rpm). If the answer to the question of the step 43 is affirmative or yes, the retard correction value VPROD1 is selected from the values VPRODi determined in the above described manner, followed by the program proceeding to the step 48. On the contrary, if the answer to the question of the step 43 is negative or no, the program proceeds to the step 45 wherein it is determined whether or not the engine rotational speed Ne is above the other predetermined value NIGPR1 (e.g. 3000 rpm). If the answer to the question of the step 45 is affirmative or yes, that is, if the engine rotational speed Ne is below the predetermined value NIGPR2 (5000 rpm) and above the predetermined value NIGPR1 (3000 rpm), the retard correction value VPROD2 is selected from the values VOPRODi at the step 46. Then, the program proceeds to the step 48. If the answer to the question of the step 45 is negative or no, that is, if the engine rotational speed Ne is below the predetermined value NIGPR1 (3000 rpm), the retard correction value VPROD3 is selected from the values VPRODi at the step 47, followed by the program proceeding to the step 48.

At the step 48, the retard correction value VPRODi, expressed in terms of the ternary notation, selected at the step 44, 46, or 47 is multiplied by a predetermined coefficient (=2), and the resulting product is applied as the retard correction value $\theta$IGVPRO, followed by termination of the program. The retard correction value $\theta$IGVPRO thus obtained is applied to the aforementioned equation (2) to effect retardation in the ignition advance angle $\theta$IG (VPRO correction), and the ignition timing control is carried out by the use of the thus retarded ignition advance angle $\theta$IG.

It should be noted that the retard correction value $\theta$IGVPRODi selected from the three values can be 0, like the retard correction value $\theta$IGVPRO1 corresponding to VPRO POINT 10 in the above described example. In such a case, the ignition advance angle $\theta$IG is not corrected, that is, VPRO correction is not effected It means that the retard correction is effected depending upon the engine rotational speed Ne so that it takes place only in those operating regions in which knocking can occur.

As described above, according to the invention, the ignition timing can be adjusted in a simple manner so as to prevent knocking of the engine in the predetermined high load condition at the time of delivery of the engine from the plant as well as at maintenance operation. Further, since only numerical values or VPRO POINT numbers corresponding to values of output voltage generated from the variable voltage creating means, it is possible to greatly reduce the quantity of data to be stored in ROM.

Although in the present embodiment the retard correction was described, advance correction may also be effected in a manner similar to that described above.

Further, although in the present embodiment the retard correction value VPRODi is calculated each time the program is executed, it may be so arranged that the retard correction value is stored in the RAM 28 once it has been determined, and it is read therefrom to be applied to the retard correction.

Although the above described embodiment employs the method of converting a VPRO POINT number to a numerical value in the number system with a predetermined number, e.g. 3, as the base so as to reduce the capacity of the ROM 27, the primary object of the invention is to prevent knocking in the predetermined high load condition of the engine by correcting the ignition timing by a correction value read from fixed memory means which corresponds to the voltage value set in the variable voltage creating means. It is therefore to be understood that the invention is not limited to the above described embodiment wherein a VPRO POINT number is converted to a numerical value in the number system with a predetermined number as the base.

What is claimed is:

1. An ignition timing control method for an internal combustion engine wherein ignition timing of the engine is controlled in response to operating conditions of the engine to appropriate values for the operating conditions of the engine, based upon advance angle control data read from memory means in which they are stored, the method comprising the steps of:

(1) storing beforehand a plurality of correction values as a function of the rotational speed of the engine and an output voltage from a variable voltage creating means which is humanly adjustable to a voltage value appropriate to each individual engine from the outside of an ignition timing control system to which said method is applied, after mass production of said system;

(2) detecting said output voltage from said variable voltage creating means;

(3) detecting the rotational speed of the engine;

(4) reading one of said correction values, which corresponds to the detected output voltage and the detected rotational speed of the engine; and (5) arithmetically correcting the ignition timing which is determined beforehand in response to operating conditions of the engine, by the use of said read one correction value.

2. A method as claimed in claim 1, including the step of detecting a value of a parameter indicative of load on the engine, and wherein said steps (2)–(5) are executed when the detected value of said parameter is above a predetermined value.

3. A method as claimed in claim 1, wherein said step (5) comprises retarding the ignition timing by said read one correction value.

4. A method as claimed in claim 1, wherein said variable voltage creating means is adjusted to cause selection of said correction values for the ignition timing so as to prevent knocking of the engine in a predetermined high load condition.

5. An ignition timing control method for an internal combustion engine wherein ignition timing of the engine is controlled in response to operating conditions of the engine to appropriate values for the operating conditions of the engine, based upon advance angle control data read from memory means in which they are stored, the method comprising the steps of: (1) storing beforehand a plurality of stored values corresponding to respective different values of an output voltage from a variable voltage creating means which is humanly adjustable; (2) providing a predetermined number of divided regions of the rotational speed of the engine; (3) detecting said output voltage from said variable voltage creating means; (4) reading one of said stored values, which corresponds to the detected output voltage; (5) converting the read one stored value to a numerical value in the number system with a predetermined number as the base, said numerical value being of the same number of figures as the predetermined number of the divided regions of the engine rotational speed, said figures corresponding to respective ones of the divided regions of the engine rotational speed; (6) detecting the rotational speed of the engine; (7) detecting in which of the divided regions of the engine rotational speed the detected engine rotational speed lies; and (8) determining a correction value for correcting the ignition timing in accordance with one of said figures of said numerical value corresponding to the detected divided region of the engine rotational speed.

6. A method as claimed in claim 5, wherein the smallest one of said plurality of stored values corresponds to the smallest one of said different values of said output voltage from said variable voltage creating means and is converted to a numerical value equal to zero in the number system with the predetermined number as the base.

7. A method as claimed in claim 5, including the step of detecting a value of a parameter indicative of load on the engine, and wherein said steps (3)–(8) are executed when the detected value of said parameter is above a predetermined value.

8. A method as claimed in claim 5, wherein said step (8) comprises retarding the ignition timing by said read one correction value.

9. A method as claimed in claim 5, wherein said variable voltage creating means is adjusted to cause selection of said correction values for the ignition timing so as to prevent knocking of the engine in a predetermined high load condition.

10. An ignition timing control method for an internal combustion engine wherein ignition timing of the engine is controlled in response to operating conditions of the engine to appropriate values for the operating conditions of the engine, based upon advance angle control data read from memory means in which they are stored, the method comprising the steps of:

(1) storing beforehand a plurality of correction values as a function of an output voltage from a variable voltage creating means which is humanly ajdustable and the rotational speed of the engine;

(2) adjusting said variable voltage creating means to cause selection of said correction values for the ignition timing so as to prevent knocking of the engine in a predetermined high load condition;

(3) detecting said output voltage from said variable voltage creating means;

(4) detecting the rotational speed of the engine;

(5) reading one of said correction values, which corresponds to the detected output voltage and the detected rotational speed of the engine; and (6) correcting the ignition timing by the use of said read one correction value.

* * * * *